United States Patent [19]

Herron et al.

[11] Patent Number: 5,350,794
[45] Date of Patent: Sep. 27, 1994

[54] ALIPHATIC POLYAMIDE COMPOSITIONS AND FIBERS

[75] Inventors: Norman Herron, Newark; Ying Wang, Wilmington, both of Del.

[73] Assignee: E. I. du Pont de Nemours and Company, Wilmington, Del.

[21] Appl. No.: 97,413

[22] Filed: Jul. 22, 1993

[51] Int. Cl.$^5$ ................................................. C08K 3/04
[52] U.S. Cl. .................................... 524/496; 524/495
[58] Field of Search ................................ 524/495, 496

[56] References Cited

U.S. PATENT DOCUMENTS 4,702,859 10/1987 Shimizu et al. ..................... 524/495
5,247,022 9/1993 McKee et al. ...................... 524/495

OTHER PUBLICATIONS

Kratschmer et al., Nature, vol. 347, pp. 354–358 (1990).
"Nylon Plastics", ed. by M. I. Kohan, John–Wiley and Sons, New York, 1973.
Shinohara et al., J. Phys. Chem., vol. 95, pp. 8449–8451.
Diederich et al., Science, vol. 252, pp. 548–551, 1991.

*Primary Examiner*—Kriellion S. Morgan
*Attorney, Agent, or Firm*—Susan Borden Evans

[57] ABSTRACT

The disclosed invention relates to novel aliphatic polyamide compositions with a fullerene compound component and fibers therefrom.

10 Claims, No Drawings

ALIPHATIC POLYAMIDE COMPOSITIONS AND FIBERS

BACKGROUND OF THE INVENTION

This invention relates to polymeric compositions of aliphatic polyamides with a fullerene component, and fibers therefrom.

Since the isolation of fullerene compounds by Kratschmer et al., Nature, Vol. 347, pp. 354–358 (1990), the chemistry surrounding fullerene compounds has been the focus of intense research. Fullerene compounds have been studied alone and in combination with other substances with the goal of modifying the properties of the resulting compositions.

Copending, commonly assigned, application Ser. No. 07/954,181 describes the use of fullerene compounds to provide improved photoconductive compositions from both photoconductive and non-photoconductive polymers. Copending, commonly assigned, application Ser. No. 08/052,810, filed Apr. 23, 1993, describes the use of fullerene compounds to impart torsional modulus to compositions comprising aromatic polyamides and fullerene compounds.

The present invention is directed to novel compositions of fullerene compounds and aliphatic polyamides which can be spun into fibers. The resulting fibers generally have improved tensile strength, as measured by the maximum tenacity, and are less stretchable, as measured by the maximum elongation. Of particular commercial importance in the practice of this invention are the class of aliphatic polyamides known as nylons, which can be processed as fibers, films, and solid parts and have uses such as: structural composites, clothes, and carpets ("Nylon Plastics", ed. by M. I. Kohan, John-Wiley and Sons, New York, 1973).

Improved tenacity (that is, higher breaking load) is advantageous for many fiber-based applications. Reduced stretchiness is particularly useful for the fibers in nylon fabric. The improved nylon fabric could be used as sails in boats and kites where the fabric utilized is often under constant wind tension.

SUMMARY OF THE INVENTION

The present invention provides aliphatic polyamide compositions and fibers therefrom of improved tensile strength and reduced stretchiness compared to undoped aliphatic polyamides consisting essentially of an aliphatic polyamide, and from about 0.1 to about 20% by weight, based on the weight of the aliphatic polyamide, of a fullerene compound. A further embodiment of the invention provides a fiber comprised of an aliphatic polyamide, and from about 0.1 to about 20% by weight, based on the weight of the aliphatic polyamide, of a fullerene compound. A further embodiment of the invention provides a process for changing the tensile properties of fibers spun from aliphatic polyamides by adding an effective amount of a fullerene compound to form a mixture of aliphatic polyamide and fullerene compound prior to spinning and thereafter spinning said mixture to form said fiber.

DETAILS OF THE INVENTION

Aliphatic polyamides useful in the practice of this invention can be classified according to the starting materials used. These aliphatic polyamides, made from diamines and diacids, are sometimes conveniently referred to as AABB-type, as shown in the following formula for the repeat unit:

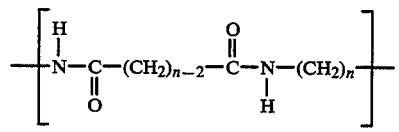

AABB-type: Nylon n,n

Aliphatic polyamides from single reactants, useful in the practice of this invention, such as amino acids or lactams are AB type, as shown in the following formula for the repeat unit:

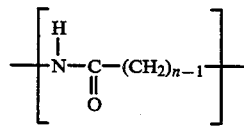

AB-type: Nylon n in both types of aliphatic polyamides n is from 3 to 6 and the relative viscosity (RV) for the aliphatic polyamide ranges from 5 to 155, and for fiber applications from 30 to 100.

Fullerene compounds of the present invention include fullerenes in the substituted and unsubstituted form. The terms fullerene and fullerene compound may be used interchangeably.

The fullerene compounds useful in this invention may have an extremely broad range of carbon atoms. Useful fullerene compounds have 20–1000 carbon atoms, or mixtures thereof, preferably fullerene compounds having 60 or 70 carbon atoms, or mixtures thereof, but can be any stable form of the fullerene compound as described in Zhang et al., J. Phys. Chem. Vol. 90, p. 525 (1986); Fowler, Chem. Phys. Lett . , Vol. 131, p. 444–450 (1986); Shinohara et al. , J. Phys. Chem. , Vol . 95, p. 8449–8451 (1991); Diederich et al. , Science, Vol. 252, p. 548–551 (1991); Smart et al. , Chemical Physics Letters, Vol. 188, p. 171–174 (1992); and Kikuchi et al , Chemical Physics Letters, Vol. 188, p. 177–180 (1992). It is also permissible to utilize any substituted form of fullerene compound, so long as the substituted form has enough electron-accepting ability to form a charge-transfer complex with electron donating molecules. Suitable examples are alkylated fullerene compounds, where the carbon atoms in the alkyl substituent varies from 1 to 20. The preferred fullerene compounds useful in the compositions and fibers of this invention may be made by a procedure described by Kratschmer et al., Nature 347–354 (1990). Fullerene compounds obtained in accordance with the methods set forth in Kratschmer et al., may contain mixtures of $C_{60}$ and $C_{70}$ and small amounts of impurities .

The concentration of fullerene compound in the compositions of the present invention is from about 0.1 to about 20% by weight, preferably 0.1 to about 5% by weight, more preferably less than 5% by weight of aliphatic polyamide. The upper limit to the amount of fullerene compound present is dictated primarily by the amount that can be incorporated into the composition, while the lower limit is about the least amount of fullerene compound useful to achieve the desired improvement in properties. The optimum balance of properties and economics is believed to be achieved between about 0.1 and about 5% by weight.

Methods of preparation wherein fullerene compounds can be incorporated (i.e., doped) into these aliphatic polyamides include: (i) in-situ polymerization; (ii) dissolving both fullerene compound and aliphatic polyamide in a common solvent; or (iii) dissolving the fullerene compound into the aliphatic polyamide melt. Methods (ii) and (iii) are the preferred methods of this invention (Examples 1 and 2).

Examples of common solvents for use in method (ii) include: N,N-dimethylformamide, o-chlorophenol, 2,2,2-trifluoroethanol, and m-cresol.

Many aliphatic polyamides are used in the form of fibers, films, and solid parts. The fiber can mean finite length or continuous, single filament or monofilament or multifilament yarn. Fibers may be formed by a variety of conventional methods, e.g., melt or solvent spinning of composition and orienting the filaments. While the maximum advantages of the present invention reside in the fiber form of the composition, films may be formed by either casting a thin layer of a solution of the composition of the invention or hot pressing the melt of a composition of the invention. Solid parts can be formed by various molding techniques, such as injection molding, using the melt of a composition of the invention.

Aliphatic polyamides particularly useful herein as components of the composition of the invention include poly(hexamethylene adipamide), polycaprolactam, poly(11-aminoundecanoic acid) because of their proven utility in clothes and carpets (Kohan, p. 1, line 32).

In the Examples, the following abbreviations are used:

Nylon-11—poly ( 11-aminoundecanoic acid)
Nylon-6, 6—poly (hexamethylene adipamide)
GPD —grams per denier Several terms used in the Examples are defined below:

Tensile modulus (E) is the force per unit cross sectional area/strain per unit length.

Tensile modulus is determined from the initial slope of the stress vs. strain curve.

Maximum Tenacity is the breaking load (in gram) per denier of fiber.

Maximum Elongation is the extension of fiber under maximum load, relative to the original length (in %).

Tensile modulus, maximum tenacity and maximum elongation are measured by ASTM Method 2101.

PREPARATION OF FULLERENES

In accordance with the methods set forth in Kratschmer et al., Nature, pp. 347-354 (1990) $C_{60}$ and $C_{70}$ fullerene compounds are prepared. $\frac{1}{4}''$ graphite rods are evaporated in an evaporator under 150 torr of helium by passing electrical currents of 120 amperes at 20 volts through the rods. The black soot generated is collected and then extracted with toluene in a Soxhlet tube to obtain fullerene compounds containing mixtures of $C_{60}$, $C_{70}$ and small amount of impurities. To separate the $C_{60}$ and $C_{70}$ fullerene compounds, mixtures of these fullerene compounds are dissolved in either hexane, 5% toluene/hexane, or 20% toluene/hexane . The resulting solution is passed through a column containing neutral alumina. $C_{60}$ (purple color) comes out of the column first, followed by $C_{70}$ (orange brown). The "$C_{60}/C_{70}$ Fullerene Compound" utilized in Examples 1-3 below is prepared by the electric arc method described above.

EXAMPLE 1

The Preparation of Fullerene-Doped Nylon-11

50 grams of Nylon-11 is added to a Brabender mixer, which is preheated to 220° C., under nitrogen blanket. The temperature is raised to 228° C. to melt Nylon-11. 1 gram of the fullerene compound (2% by weight) prepared above is quickly added to the melt and mixed for 4 minutes at 75 rpm. After mixing, the resulting mixture is removed from the mixer and quenched in a quenching bath of deionized water and dried as a solid lump in a vacuum oven.

To form fibers from the resulting composition, the dried composition is placed in a conventional press spinner equipped with a series of five mesh screens positioned above a single spinneret hole. The spinneret hole is $2.3 \times 10^{-4}$ meters in diameter and $2.3 \times 10^{-4}$ meters long. Four runs are made, heating the composition to each of the temperatures shown in Table 1 below and extruding the composition at the stated temperature under the stated pressure through the spinneret hole, whereby the fiber precursor is quenched in air and wound onto a feed roll at 40 meters per minute and on to a draw roll at the speeds shown in Table 1. A draw pin at a temperature of 120° C. is placed in contact with the fiber between the feed roll and the draw roll. The average denier of the fibers from the four runs is 17.2. The tensile modulus, maximum tenacity, and maximum elongation are 25.6 GPD, 4.2 GPD, and 34.7%, on average of the four runs, respectively.

TABLE 1

| Run No. | Extrusion Temperature (°C.) | Pressure (Pascals) | Speed of Draw Roll (meters/min) |
|---|---|---|---|
| 1A | 233 | $8.0 \times 10^{+6}$ | 120 |
| 1B | 232 | $7.7 \times 10^{+6}$ | 140 |
| 1C | 253 | $7.1 \times 10^{+6}$ | 160 |
| 1D | 249 | $6.1 \times 10^{+6}$ | 160 |

For purposes of comparison, Nylon-11 is subjected to the same procedures as described above except that no fullerene compound is added. Three runs of fibers are extruded from the melt using the procedure described above except at 200° C. and at draw roll speeds of 120, 140 and 160 meters per minute, respectively. The average denier of the fiber from the three runs is 24.6. The tensile modulus, maximum tenacity, and maximum elongation are 24.6 GPD, 3.2 GPD, and 55.3%, on average of the three runs, respectively.

In this Example 1 the doping of Nylon-11 with 2% fullerene compound by weight increases the maximum tenacity by 30% and reduces the maximum elongation by 37% .

EXAMPLE 2

The Preparation of Fullerene-Doped Nylon-6,6

The procedure of Example 1 was followed except that Nylon-6,6 is added to the Brabender mixer, which is preheated to 290° C. and mixed for 5 minutes at 75 rpm.

Four runs of fibers are extruded from the melt in the manner described above under the conditions listed in Table 2.

TABLE 2

| Run No. | Extrusion Temperature (°C.) | Pressure (Pascals) | Speed of Draw Roll (meters/min) |
| --- | --- | --- | --- |
| 2A | 288 | $5.2 \times 10^{+6}$ | 120 |
| 2B | 288 | $5.3 \times 10^{+6}$ | 140 |
| 2C | 303 | $5.2 \times 10^{+6}$ | 140 |
| 2D | 303 | $5.2 \times 10^{+6}$ | 160 |

The denier of the fiber from the four runs is 25. The tensile modulus, maximum tenacity, and maximum elongation are 18.9 GPD, 2.6 GPD, and 48.6%, on average from the four runs, respectively.

For purposes of comparison, undoped Nylon-6,6 is subjected to the same procedures as described above except that no fullerene compound is added. Three runs of fibers are extruded from the melt at 288° C. and at draw roll speeds of 120, 140 and 160 meters per minute, respectively. The fiber from the three runs has an average denier of 21.2. The tensile modulus, maximum tenacity, and maximum elongation are 18.6 GPD, 3.7 GPD, and 97.2%, on average of the three runs, respectively.

In this Example 2, the doping of Nylon-6,6 with 2% fullerene compound by weight reduced the maximum elongation by 50%.

EXAMPLE 3

The Preparation of Fullerene Compound-Doped Nylon-11 using Co-Solvent 1 gram of pelletized nylon-11 is dissolved into 10 mL boiling N,N-dimethylformamide (DMF) under nitrogen in a glove box. When all dissolved, a second solution of 0.05 g fullerene compound mixture in 5 ccs of hot DMF is filtered through a 0.2 micron filter into the nylon-11 solution. The clear brown solution is stirred for 5 minutes and then evaporated to dryness under high vacuum overnight at room temperature. The resultant light brown powder is recovered and may be used either as is or remelted under nitrogen (~220° C.) forming a solid pellet of fullerene compound-doped polymer. This method provides a very uniform doping of the polymer with the fullerene compound dopant as judged by the clarity and homogeneity of melt pressed films of the material.

What is claimed is:

1. An aliphatic polyamide composition consisting essentially of an aliphatic polyamide, and from about 0.1 to about 20% by weight, based on the weight of the aliphatic polyamide, of a fullerene compound.

2. A fiber comprised of an aliphatic polyamide, and from about 0.1 to about 20% by weight, based on the weight of the aliphatic polyamide, of a fullerene compound.

3. A fiber of claim 2 wherein the fullerene compound has from about 20 to 1000 carbon atoms and is present in an amount of from about 0.1 to about 5% by weight of said aliphatic polyamide.

4. A fiber of claim 3 wherein the aliphatic polyamide is selected from poly(ll-aminoundecanoic acid) and poly(hexamethylene adipamide).

5. A fiber of claim 4 wherein said fullerene compound has from 60 to 70 carbon atoms.

6. A fiber of claim 5 wherein the fullerene compound is present in an amount of less than 5% by weight of said aliphatic polyamide.

7. A fiber of claim 6 wherein the aliphatic polyamide is poly(ll-aminoundecanoic acid).

8. A fiber of claim 6 wherein the aliphatic polyamide is poly(hexamethylene adipamide).

9. A process for changing tensile properties of fibers spun from aliphatic polyamides by adding an effective amount of fullerene compound to form an aliphatic polyamide fullerene compound mixture prior to spinning and thereafter spinning said mixture to form said fiber.

10. A process according to claim 9 wherein the fullerene compound has from about 60 to 70 carbon atoms and is present in an amount of less than 5% by weight of said aliphatic polyamide.

* * * * *